(12) United States Patent
Borchers et al.

(10) Patent No.: US 7,819,224 B2
(45) Date of Patent: Oct. 26, 2010

(54) ASSEMBLY FOR REDUCING NOISE IN TURBOFAN ENGINES

(75) Inventors: Ingo Udo Borchers, Uhldingen-Muehlhofen (DE); Roger Drobietz, Salem (DE); Roland Uhlig, Markdorf (DE)

(73) Assignee: EADS Deutschland GmbH, Ottobrunn (DE)

( * ) Notice: Subject to any disclaimer, the term of this patent is extended or adjusted under 35 U.S.C. 154(b) by 261 days.

(21) Appl. No.: 10/592,932

(22) PCT Filed: Jan. 20, 2005

(86) PCT No.: PCT/DE2005/000073

§ 371 (c)(1),
(2), (4) Date: Sep. 4, 2008

(87) PCT Pub. No.: WO2005/091272

PCT Pub. Date: Sep. 29, 2005

(65) Prior Publication Data

US 2008/0308345 A1 Dec. 18, 2008

(30) Foreign Application Priority Data

Mar. 17, 2004 (DE) ........................ 10 2004 012 929

(51) Int. Cl.
*E04B 1/82* (2006.01)
(52) U.S. Cl. ................... 181/292; 181/213; 181/286
(58) Field of Classification Search ............... 181/210, 181/213, 288, 292, 293, 286; 244/1 N; 415/119
See application file for complete search history.

(56) References Cited

U.S. PATENT DOCUMENTS

| 3,174,580 | A | * | 3/1965 | Schulz et al. | ............... 181/290 |
| 3,437,173 | A | * | 4/1969 | Ehrich | ................. 181/213 |
| 3,819,007 | A | * | 6/1974 | Wirt et al. | ................. 181/286 |
| 3,819,009 | A | | 6/1974 | Motsinger | |
| 3,887,031 | A | * | 6/1975 | Wirt | ........................... 181/286 |
| 4,106,587 | A | * | 8/1978 | Nash et al. | ................. 181/213 |
| 4,135,603 | A | * | 1/1979 | Dean et al. | ................. 181/286 |
| 4,150,732 | A | * | 4/1979 | Hoch et al. | ................. 181/213 |
| 4,231,447 | A | * | 11/1980 | Chapman | ................. 181/213 |
| 4,452,335 | A | * | 6/1984 | Mathews et al. | ........... 181/214 |
| 5,185,504 | A | * | 2/1993 | Jen | ........................... 181/286 |

(Continued)

FOREIGN PATENT DOCUMENTS

DE 196 07 290 A1 10/1996

(Continued)

OTHER PUBLICATIONS

International Search Report dated Jun. 15, 2005 with English translations of the pertinent portions (fourteen (14) pages).

*Primary Examiner*—Jeffrey Donels
*Assistant Examiner*—Jeremy Luks
(74) *Attorney, Agent, or Firm*—Crowell & Moring LLP

(57) ABSTRACT

An assembly is provided for reducing the noise that is generated in the heating gas zone by turbofan engines. The assembly consists of an acoustically absorbent cladding in the heating gas flow channel of the turbofan engine. The cladding includes a plurality of neighboring cavities, into each of which four horns extends. The mouths of the horns are fixed to a perforated cover sheet. The cover sheet forms one wall of the heating gas flow channel.

8 Claims, 2 Drawing Sheets

U.S. PATENT DOCUMENTS

| | | |
|---|---|---|
| 5,386,689 A | 2/1995 | Bozich et al. |
| 5,512,715 A * | 4/1996 | Takewa et al. ............... 181/295 |
| 5,670,758 A * | 9/1997 | Borchers et al. ............ 181/286 |
| 5,760,349 A * | 6/1998 | Borchers et al. ............ 181/286 |

FOREIGN PATENT DOCUMENTS

| | | |
|---|---|---|
| DE | 196 07 290 C2 | 10/1996 |
| EP | 0 738 865 B1 | 10/1996 |
| GB | 1 470 036 | 4/1977 |
| GB | 2 005 384 A | 4/1979 |

\* cited by examiner

ASSEMBLY FOR REDUCING NOISE IN TURBOFAN ENGINES

BACKGROUND AND SUMMARY OF THE INVENTION

This invention relates to an arrangement for abatement of the noise generated by turbofan drives, specifically in the hot gas area.

Active methods for abatement of the noise generated by turbofan drives in the hot gas area are known, for example, from U.S. Pat. No. 5,386,689. To abate noise in this way, sound sources are provided for generating antisound in the hot gas area of the drives.

German document DE 196 07 290 A1 describes an acoustic absorber consisting of a pot-shaped bottom part in which a single horn extends.

The object of this invention is to create an arrangement with which effective abatement of noise generated by turbofan drives in the hot gas area can be achieved while having a low weight in accordance with the requirements of aviation technology.

This object is achieved with the arrangement claimed. Advantageous embodiments are also claimed.

According to this invention, energy is withdrawn from the sound waves generated in the hot gas area of a turbofan drive by means of an absorbent lining of the hot gas area of the turbofan drive and then are no longer emitted. Dissipation is accomplished through viscous losses in the lining.

The lining is structured so that it has a plurality of adjacent cavities, with four horns extend into each cavity.

The horns have mouths attached to a perforated cover plate, and the cover plate forms a wall of the hot gas flow channel.

The invention will now be explained with reference to an exemplary embodiment shown in the drawings.

DETAILED DESCRIPTION OF THE INVENTION

Figure 1:
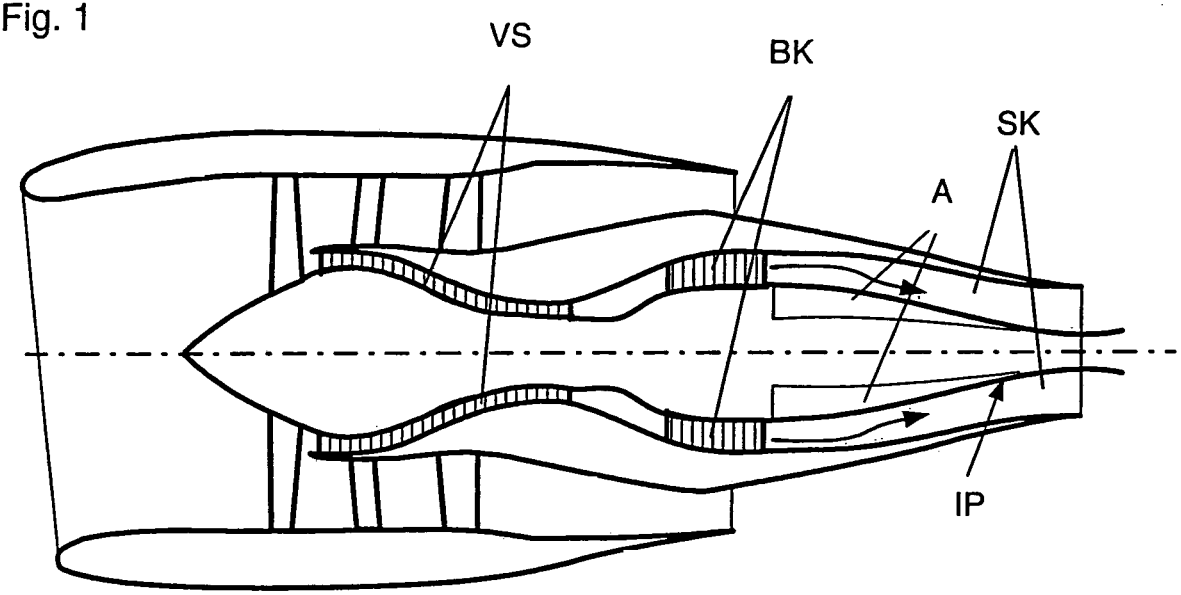
FIG. 1 shows a cross-sectional diagram of a turbofan drive having an inventive acoustically absorbent lining in the hot gas area.

FIG. 1 shows a cross-sectional diagram of a turbofan drive. The fresh air drawn in is divided into two substreams. A first portion is sent past the combustion chamber BK to the nozzle, where it is mixed with hot exhaust gases from the combustion chamber BK (so-called bypass). The other substream is sent via multiple compressor stages VS into the combustion chamber BK (annular cross section) and from there to the nozzle. The flow channel SK, having an annular cross section downstream from the combustion chamber BK, is the hot gas area of the drive in the sense of the present invention. It is equipped with the inventive sound-absorbing lining A, such that the sound-absorbing lining A forms the outer wall of the so-called internal plug IP of the drive.

Figure 2:
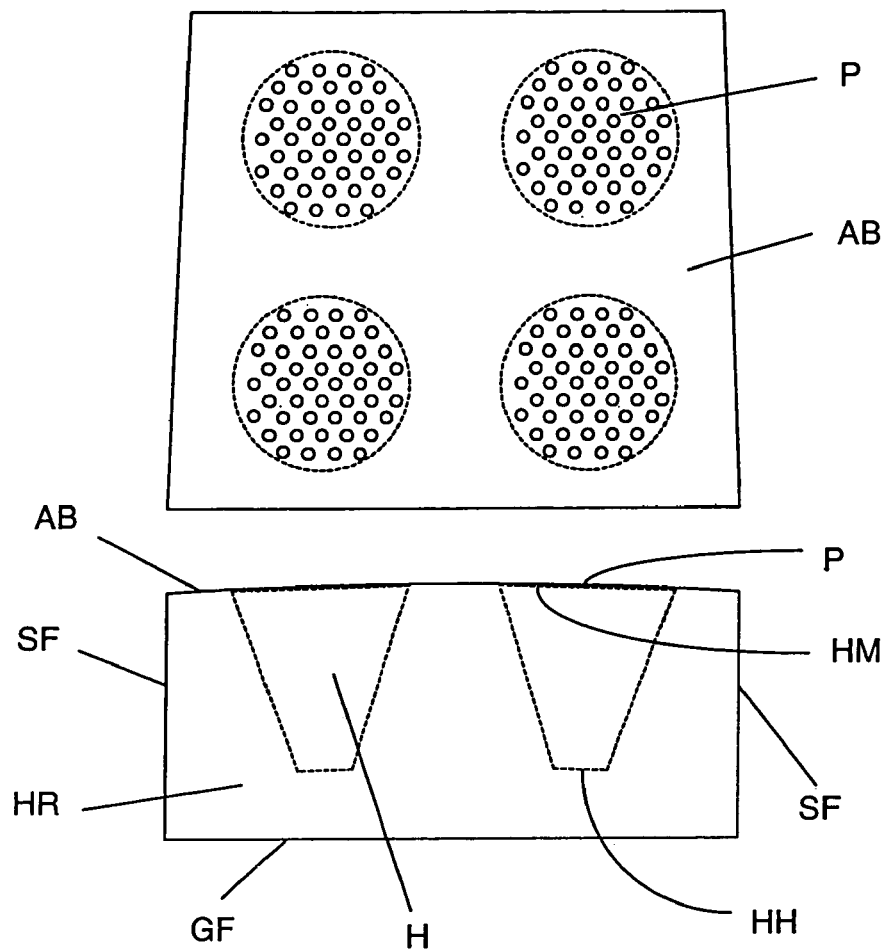
FIG. 2 shows a view from above and a cross-sectional view from the front of the absorbent lining.

The absorbent lining A comprises a plurality of essentially cubical cavities HR having an approximately square ground area GF, into which four horns H are introduced (FIG. 2). Other ground areas, e.g., in the form of a hexagon are also possible. The horns have a first opening with a larger diameter—the so-called mouth HM of the horn—and a second opening with a smaller diameter—the so-called throat HH of the horn. The horns H are attached to a cover plate AB by spot welding at the mouth HM of the horn. The cover plate AB is perforated in the area of the mouth HM of the horn (area of the perforation P) with a porosity of at least 20%, and 30% in a preferred embodiment, whereby the diameter of the holes is 1 mm. The horns H preferably have a circular cross section. The horns do not extend to the ground area GF of a cavity, so that an interspace remains between the throat HH of the horn and the ground area GF.

A cavity HR is bordered by four side faces SF in addition to the cover plate AB and the ground area GF. The cavities are arranged directly side by side without any interspaces in the manner of cassetting and each is separated from the others by a common side wall SF. This yields a very weight-saving design.

Figure 3:
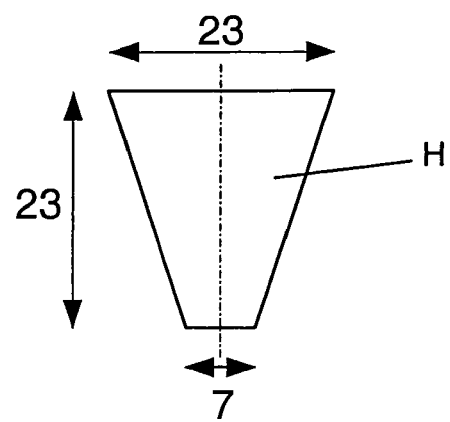
FIG. 3 shows a diagram of the horn geometry of the absorbent lining.

FIG. 3 shows a specific example of the horn geometry, whereby the dimensions are given specifically (in mm).

Length of the horns (measured axially): 23 mm
Diameter of the mouth of the horn: 23 mm
Diameter of the throat of the horn: 7 mm The depth of the cavities—measured in the direction of the horn—is 34 mm.

The taper in the horn wall from the mouth of the horn to the throat of the horn need not necessarily be linear. Other forms, e.g., hyperbolic or in the manner of a segment of a circle, are also possible.

The absorbent structure is based on the same principle as a Helmholtz resonator. The air mass passing through the perforations into the horns is coupled to the cavity volume surrounding it and thus represents a damped spring-mass system. Use of these absorbers allows the absorption of acoustic energy with a small design height. A structure having the dimensions above results in maximum absorption in the case of resonance occurring at temperatures around T=440° C. and Mach numbers of M=0.3. Sound is absorbed here in the frequency range between 830 and 1250 Hz.

The invention claimed is:

1. An acoustically absorbent lining for a hot gas flow channel of an arrangement for abatement of noise generated by a turbofan drive comprising:

a plurality of adjacent cavities, each of said cavities defined by side faces, a ground face, and a perforated cover plate, and four horns attached to each cover plate and extending from said cover plate into each cavity of said plurality of adjacent cavities, each of said horns defining a mouth having a mouth area and a throat having a throat area that is smaller than said mouth area, wherein all of the four horns are attached at respective mouths thereof to said perforated cover plate, wherein perforations in said cover plate are confined to discrete perforation areas of said cover plate, with unperforated areas of said cover plate disposed therebetween, said discrete perforation areas being delimited by the mouth areas of said horns, and wherein the cover plate forms a wall of the hot gas flow channel.

2. The lining as claimed in claim 1, wherein the cavities, measured in directions of the horns, are 34 mm deep, wherein the horns are 23 mm long, wherein a diameter of the mouth is 23 mm, and wherein a diameter of a throat of the horn is 7 mm.

3. The lining as claimed in claim 1, wherein the cover plate has a porosity which amounts to at least 20%.

4. The lining as claimed in claim 2, wherein the cover plate has a porosity which amounts to at least 20%.

5. The lining as claimed in claim 1, wherein said cavities are arranged directly side by side, and each cavity is separated from adjacent cavities by common side walls.

6. The lining as claimed in claim 2, wherein said cavities are arranged directly side by side, and each cavity is separated from adjacent cavities by common side walls.

7. The lining as claimed in claim 3, wherein said cavities are arranged directly side by side, and each cavity is separated from adjacent cavities by common side walls.

8. The lining as claimed in claim 4, wherein said cavities are arranged directly side by side, and each cavity is separated from adjacent cavities by common side walls.

* * * * *